Jan. 5, 1926.
R. S. BASSETT
LIQUID STRAINER
Filed May 4, 1925
1,568,126
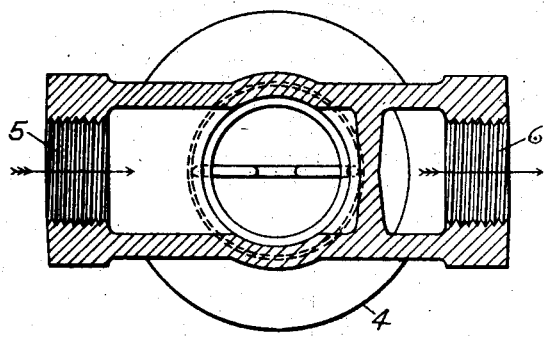
FIG. 1.
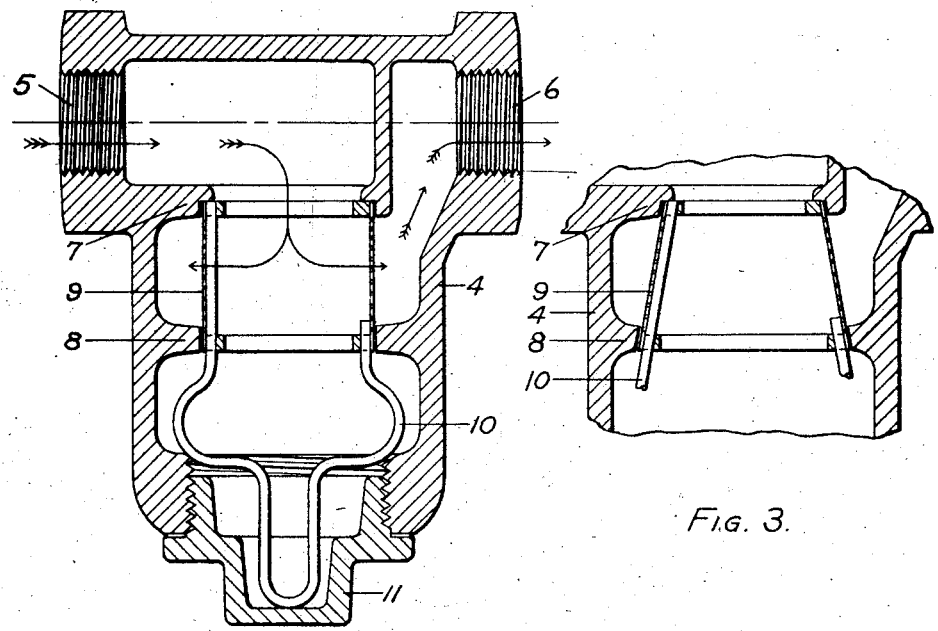
FIG. 2.
FIG. 3.
WITNESSES:
INVENTOR
Robert S. Bassett Patented Jan. 5, 1926.

1,568,126

UNITED STATES PATENT OFFICE.

ROBERT S. BASSETT, OF BUFFALO, NEW YORK.

LIQUID STRAINER.

Application filed May 4, 1925. Serial No. 27,668.

*To all whom it may concern:*

Be it known that I, ROBERT S. BASSETT, a citizen of the United States, residing at Buffalo, in the county of Erie and State of New York, have invented new and useful Improvements in Liquid Strainers, of which the following is a specification.

My invention relates to improvements in liquid strainers in which an upright casing is divided into three chambers by means of two partitions, each of which partitions has a single vertical opening or perforation. A screen of circular horizontal cross section and open at either end connects the two partitions at the perforations. This screen is supported in place by means of a semi-rigid supporting member which engages the main casing body of the strainer in such a manner as to provide a positive means of support for the strainer screen when the strainer is in operation.

The objects of my improvements are:—

(1) To provide a distinct sediment chamber of appreciable size and entirely below the strainer screen and out of the path of the flowing liquid, a result not possible with present designs where the inlet portion of the strainer is directly connected to the sediment chamber by means of ports and passages which causes the inlet flow to continuously disturb the accumulation of sediment in the sediment chamber, while my invention provides a sediment chamber entirely removed from all through flow.

(2) To provide a strainer of the above type which will allow complete drainage of the pipe line, the screen being entirely below the inlet and outlet openings in the strainer casing.

(3) To provide in connection with previously mentioned advantages a screen which is self-cleaning and which has the flow of liquid downward through it from the inlet opening so that the force of gravity will aid the liquid in cleaning the screen when opening at the lower end of the strainer casing is opened for flushing the strainer.

(4) To provide a self-cleaning strainer screen with provision for a deposit of sediment away from the screen to give complete effectiveness of the screening area of the screen after the deposit of a considerable quantity of sediment.

(5) To provide a semi-rigid means of support for the strainer screen so as to take up slight variations in dimensions of the strainer casing and at the same time to lock said means of support rigidly in place when the strainer is closed up for operation.

The invention also comprises details of the construction as shown in the accompanying drawing in which Fig. 1 is a horizontal sectional view taken through the center of the inlet and outlet openings.

Fig. 2 is a vertical sectional view taken centrally through the complete strainer.

Fig. 3 is the same section as Fig. 2 and shows a modified form of screen. Similar numerals refer to similar parts throughout the several views.

4 designates the strainer casing with inlet opening 5 and outlet opening 6. The through passage of the liquid is interrupted by upper partition 7 which has but a single opening which is circular and upright. Lower partition 8 divides the outlet opening from the sediment chamber at the bottom of the casing and has a single upright circular opening generally concentric with the opening in partition 7.

Screen 9 is circular in cross section and may be either tubular as shown in Fig. 2 or conical as shown in Fig. 3. 10 is a semi-rigid screen support which is not limited to the exact construction shown and which engages both the strainer casing 4 and the bottom opening closure plug 11, the contact between screen support 10 and strainer plug 11 holding screen support 10 firmly against casing 4. When plug 11 is removed, however, screen support 10 may be sprung together so that its extreme transverse dimensions become smaller than that of the bottom opening in casing 4 which will allow the withdrawal of the screen support together with the screen through the bottom opening.

I claim:

1. A liquid strainer comprising a casing having an inlet passage, an outlet passage, a sediment chamber, a cleaning opening at the end of said casing, a partition with one perforation separating said inlet passage from said outlet passage, a second partition below said first partition, with one perforation and separating said outlet passage from said sediment chamber, combined with a tubular screen open at both ends, insertible through said cleaning opening and said sediment chamber, engaging said partitions at the perforations, and connecting said inlet passage to said sediment chamber.

2. A liquid strainer comprising a casing having an inlet and outlet, and a cleaning opening at the lower end, a seat formed within said casing, a tubular screen open at both ends, intermediate the inlet and outlet, insertible through the cleaning opening and seating on said seat, a flexible screen support engaging the casing to hold said screen in place, and a closure for said cleaning opening engaging, when closed, said support to flexibly clamp the screen against the seat.

ROBERT S. BASSETT.